United States Patent
Kawamura

[11] Patent Number: 6,134,195
[45] Date of Patent: Oct. 17, 2000

[54] OPTICAL PICKUP DEVICE

[75] Inventor: Hiroshi Kawamura, Tokyo, Japan

[73] Assignee: Sony Corporation, Tokyo, Japan

[21] Appl. No.: 09/159,756

[22] Filed: Sep. 24, 1998

[30] Foreign Application Priority Data

Sep. 30, 1997 [JP] Japan ..................................... 9-267479

[51] Int. Cl.[7] ..................................................... G11B 7/12
[52] U.S. Cl. ................................. 369/44.23; 369/44.14; 369/112
[58] Field of Search ................................ 369/112, 44.14, 369/44.15, 44.16, 44.19, 44.21, 44.22, 44.23, 109; 359/813, 814

[56] References Cited

U.S. PATENT DOCUMENTS

| | | | |
|---|---|---|---|
| 5,004,307 | 4/1991 | Kino et al. ................................. | 359/356 |
| 5,125,750 | 6/1992 | Corle et al. ................................ | 359/819 |
| 5,497,359 | 3/1996 | Mamin et al. ..................... | 369/44.14 X |
| 5,729,393 | 3/1998 | Lee et al. ........................... | 369/44.15 X |
| 5,917,788 | 6/1999 | Mowry ............................... | 369/44.14 X |

FOREIGN PATENT DOCUMENTS

| | | |
|---|---|---|
| 9-251645 | 9/1997 | Japan . |
| 9-251662 | 9/1997 | Japan . |

*Primary Examiner*—Muhammad Edun
*Attorney, Agent, or Firm*—Ronald P. Kananen; Rader, Fishman & Grauer

[57] ABSTRACT

A recording/reproducing apparatus for recording and/or reproducing the information on or from an optical recording medium by illuminating laser light on it using a double-lens type objective lens unit made up of at least a first lens and a second lens. The apparatus includes a light source for radiating laser light, a first lens for converging the laser light radiated from the light source, a second lens arranged between the first lens and the optical recording medium, a detection unit for detecting the sort of the recording medium and a piezoelectric element for causing relative movement between the first and second lenses for varying the distance between the two lenses in the direction along the optical axis. Specifically, the second lens is moved by a movement unit responsive to the results of detection by the detection unit to vary the separation between the first and second lenses. This increases the numerical aperture NA and reduces the effect of aberration to enable high-density recording and/or reproduction of information signals.

18 Claims, 3 Drawing Sheets

OPTICAL PICKUP DEVICE

BACKGROUND OF THE INVENTION

1. Field of the Invention

This invention relates to an optical disc device and an optical pickup device for recording and/or reproducing information signals on or from a disc-shaped recording medium such as an optical disc, a magneto-optical disc or a phase-change disc.

2. Description of the Related Art

There has hitherto been known an optical pickup device for reproducing information signals from, for example, an optical disc. This type of the optical pickup device has an objective lens 53 for focussing a laser light beam on an information recording surface of an optical disc 51, as shown in FIG. 1. The objective lens 53 is held in a substantially cylindrically-shaped lens holder 54, as shown in FIG. 1. The inner rim of the lens holder 54 is formed with an aperture portion 55 facing the light incident surface of the objective lens 53 for throttling the laser light incident on the objective lens 53.

With recent yearning towards a higher order of the information, there is a demand for a higher capacity of information signals for an optical disc 51. For realizing the high surface density of the optical disc 51, it is necessary to reduce the spot diameter of the laser light. For reducing the spot diameter, it is necessary not only to shorten the wavelength of the laser light but also to increase the numerical aperture NA of the objective lens.

If, with the single lens type objective lens, it is attempted to increase the numerical aperture NA, it has so far been difficult to realize a pre-set non-spherical surface by a non-spherical coefficient because of the large refractive power of the single lens. With this in view, a double-lens type objective lens provided with two lenses having the optical axes coincident with each other has been proposed in U.S. Pat. No. 5,125,750. On the other hand, the technique on a double-lens type objective lens unit 56 has also been proposed in Japanese Laying-Open publication H-9-251645 (U.S. Ser. No. 08/811,727) and in Japanese Laying-Open publication H-9-251662 (U.S. Ser. No. 08/813,364).

The double-lens type objective lens unit 56, in which attempts have been made towards increasing the numerical aperture NA, is explained by referring to the drawings. The double-lens type objective lens unit 56 has a first lens 57 (forward lens) arranged facing the optical disc 52 and a second lens 58 (backward lens) arranged coaxially with the first lens 57, as shown in FIG. 2.

The double-lens type objective lens unit 56 also includes a substantially cylindrically-shaped lens holder 59 for holding the forward lens 57 and the backward lens 58, and an aperture 60 arranged on the inner rim of the lens holder 59 for throttling the laser light incident on the backward lens 58, as shown in FIG. 2.

Meanwhile, the double-lens type objective lens unit with the increased recording capacity has an information recording surface 52b closer to the forward lens 57, with the interposition of a transparent substrate 52a. This optical disc 52 has a drawback that spherical aberration is apt to be produced with an error in thickness of the transparent substrate 52a.

With this in view, it has also been proposed to provide an electromagnetic actuator, not shown, in order to adjust the separation along the optical axis (indicated by X in FIG. 2) between the forward tens and the backward lens for reducing the spherical aberration ascribable to thickness of the transparent substrate 52a of the optical disc 52.

However, the electromagnetic actuator provided in the double-lens type objective lens unit includes a magnet, a coil or a yoke to provide a magnetic circuit, so that it is rather complex in structure, Thus, the entire optical pickup device is increased in size.

In addition, with the above optical pickup device, an electrical voltage needs to be applied at all times across the electromagnetic actuator in order to maintain a distance between the forward and backward lenses.

SUMMARY OF THE INVENTION

It is therefore an object of the present invention to provide an optical pickup device in which an adjustment means for adjusting the axial distance between the first and second lenses is simplified in structure to reduce the size and weight of the entire device, and in which power consumption required in adjusting the axial distance between the first and second lenses can be reduced.

In one aspect, the present invention provides a recording/reproducing apparatus for recording and/or reproducing the information on or from an optical recording medium by illuminating laser light thereon, in which the apparatus includes a light source for radiating laser light, a first lens for converging the laser light radiated from the light source, a second lens arranged between the first lens and the optical recording medium, detection means for detecting the sort of the recording medium and movement means for causing relative movement between the first and second lenses to vary the separation therebetween along the optical axis. The movement means is a layered assembly along the direction of the optical axis of piezoelectric elements that can be displaced in the direction along the optical axis. The layered assembly is driven in association with the results of detection by the detection means.

In another aspect, the present invention provides a recording/reproducing apparatus for recording and/or reproducing the information on or from an optical recording medium by illuminating laser light thereon, in which the apparatus includes a light source for radiating laser light, a first lens for converging the laser light radiated from the light source, a second lens arranged between the first lens and the optical recording medium, a lens holder supporting the first and second lenses, a coil mounted on the lens holder, a magnetic circuit for causing movement of the lens holder in a direction along the optical axis of the light radiated from the light source and in a direction perpendicular to the optical axis, movement means for causing movement of the second lens relative to the first lens in the direction along the optical axis. The movement means is a layered assembly of piezoelectric elements along the direction of the optical axis. The piezoelectric elements can be displaced in the direction along the optical axis, while the layered assembly is driven in association with the results of detection by the detection means.

In yet another aspect, the present invention provides an optical pickup device for recording and/or reproducing the information on or from an optical recording medium by illuminating laser light thereon. The optical pickup device includes a light source for radiating laser light, a first lens for converging the laser light radiated from the light source, a second lens arranged between the first lens and the optical recording medium, and a lens holder supporting the first and second lenses. The lens holder supports the second lens for movement in a direction along the optical axis. The optical pickup device also includes a coil mounted on the lens holder, a magnetic circuit for causing movement of the lens holder in a direction along the optical axis of the light radiated from the light source and in a direction perpendicular to the optical axis, and movement means for causing movement of the second lens relative to the first lens in the direction along the optical axis. The movement means is a layered assembly of piezoelectric elements along the direction of the optical axis. The piezoelectric elements can be displaced in the direction along the optical axis.

With the optical pickup device according to the present invention, the adjustment means for adjusting the separation between the first and second lenses can be reduced in thickness and size thus enabling the device to be reduced in thickness and size. Also, with the present optical pickup device, the power consumption needed in holding the separation between the first and second lenses can be reduced.

DESCRIPTION OF THE PREFERRED EMBODIMENTS

Figure 1:
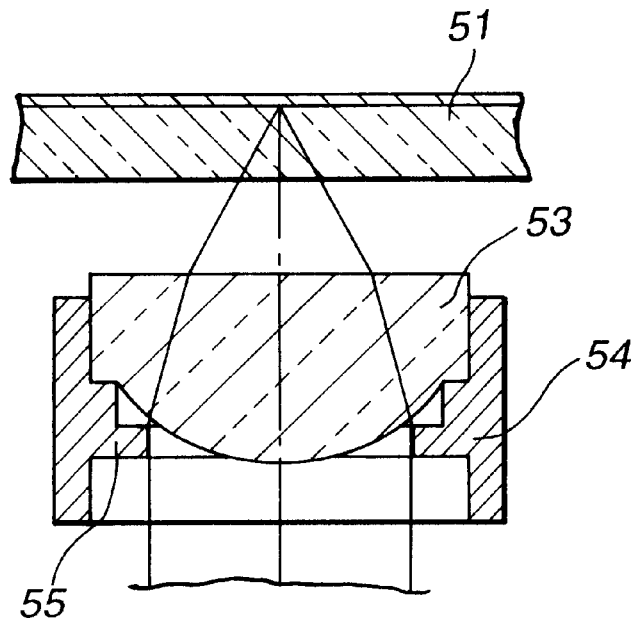
FIG. 1 is a longitudinal cross-sectional view for illustrating an objective lens provided on a conventional optical pickup device.
Figure 2:
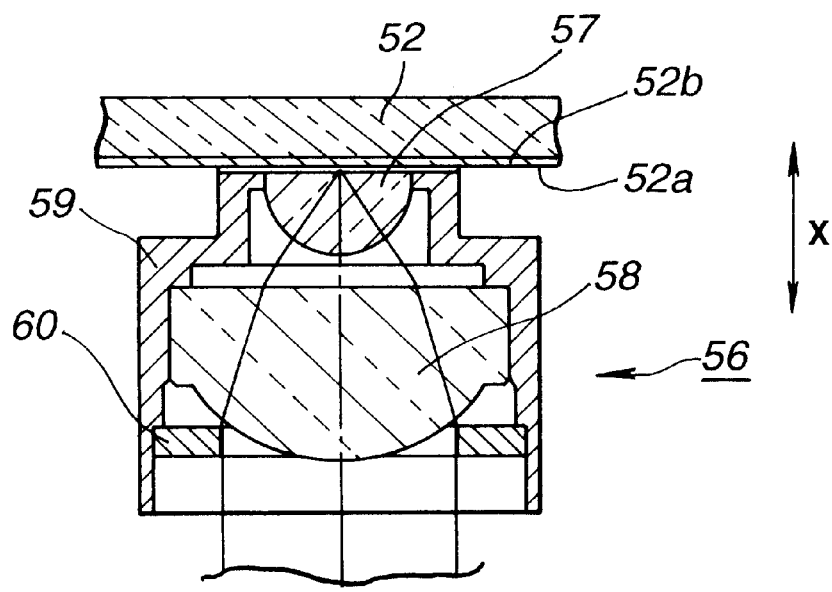
FIG. 2 is a longitudinal cross-sectional view for illustrating a double-lens type objective lens unit provided on the conventional optical pickup device.

Referring to the drawings, a preferred embodiment of an optical pickup device of the present invention will be explained in detail. An optical disc, from which the information signals are reproduced by an optical pickup device, is of high recording density. The optical disc is constructed so that the separation from the outer surface of the disc on the information readout side to the information recording surface is of the order of 0.1 mm, that is the thickness of a transparent substrate between the outer surface of the information readout side to the information recording layer is of the order of 0.1 mm.

Figure 3:
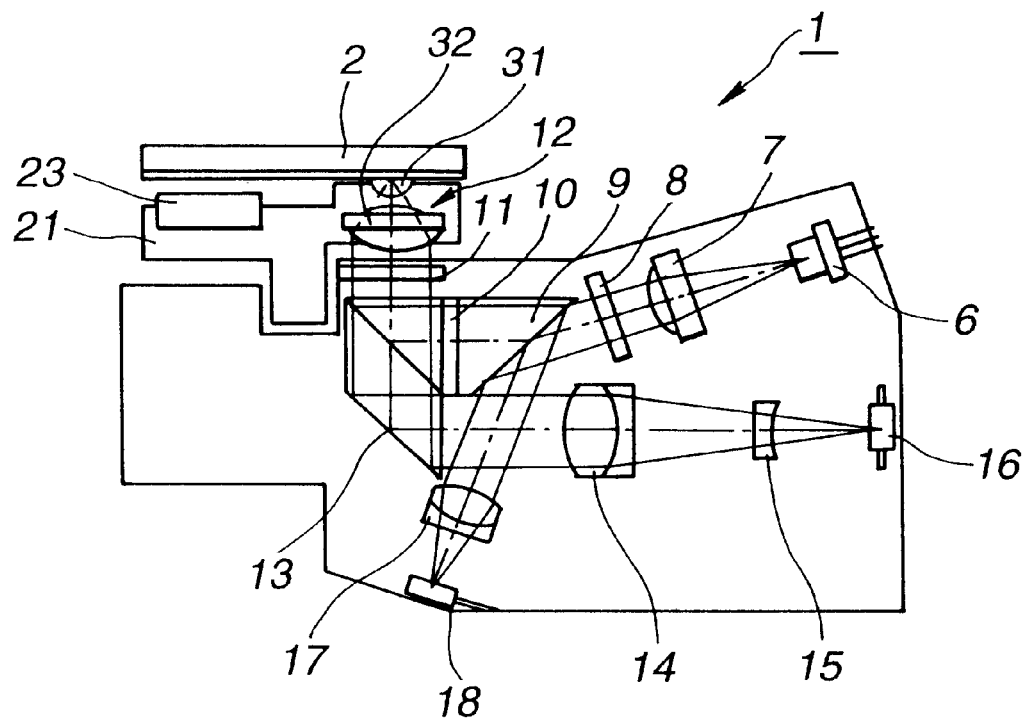
FIG. 3 is a schematic view showing an optical system of an optical pickup device according to the present invention.

Referring to FIG. 3, the optical system of the optical pickup device 1 has, looking in the proceeding direction of light on the light path, a light source 6 radiating the laser light of a short wavelength of the order of 515 to 650 nm, a collimator lens 7 for collimating the laser light radiated from the light source 6, a diffraction lattice 8, for diffracting the laser light to split the light into three beams, an anamorphic prism 9 for shaping the laser light, a half-wave plate 10 for producing a light path difference between the P-polarized light and the S-polarized light of the light beam, a quarter wave plate 11 for converting the linear polarized light into circular polarized light and a double-lens type objective lens unit 12 for focussing the laser light on a information recording surface of the optical disc 2.

Referring to FIG. 3, the optical pickup device 1 has a polarization beam splitter 13 for reflecting the laser light outgoing from the anamorphic prism 9 to cause it to fall on the quarter wave plate 11 and for transmitting the return light from the optical disc 2 therethrough. The optical pickup device 1 also has a collimator lens 14 and a multiple lens 15 for collecting the return light transmitted through the polarization beam splitter 13, and a photodetector 16 for receiving the return light from the information recording surface of the optical disc 2. The multiple lens 15 has the function of generating astigmatic aberration, in addition to the function of collecting the return light. The astigmatic aberration, produced by the multiple lens 15, is received by the photodetector 16 to detect the focussing error. The three beams, split by the diffraction lattice 8, are also detected by the photodetector to detect the tracking error.

Referring to FIG. 3, the optical pickup device 1 includes a light collecting lens 17 for collecting the light reflected by the anamorphic prism 9, and an output-adjusting photodetector 18 for receiving the laser light radiated from the light collecting lens 17 and for adjusting the output of the laser light radiated from the light source 6 based on the amount of the received light.

Figure 4:
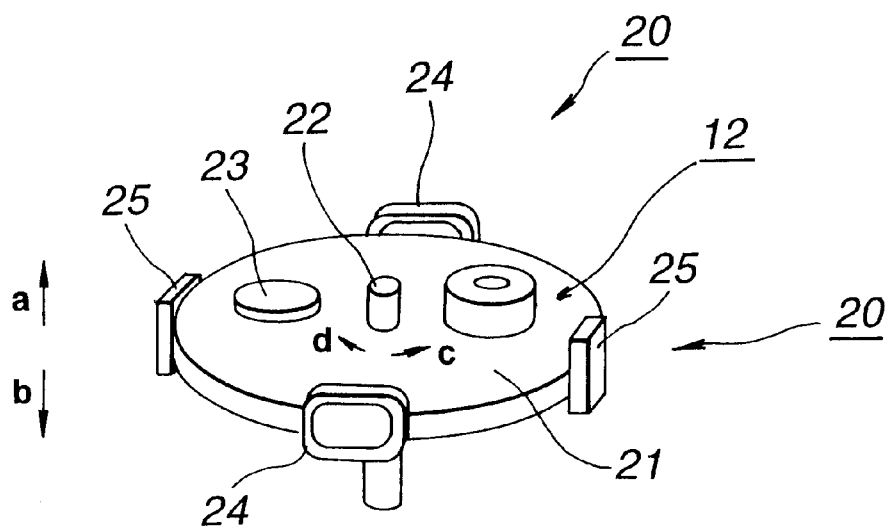
FIG. 4 is a perspective view showing a biaxial actuator provided on the optical pickup device shown in FIG. 1.

Referring to FIG. 4, the optical pickup device 1 includes a so-called shaft-rotating type biaxial actuator 20 which is made up of a bobbin 21 for supporting the double-lens type objective lens unit 12, a rotary shaft 22 for rotatably supporting the bobbin 21 and a weight 23 set on the bobbin 21.

The bobbin 21 is substantially disc-shaped and has its center supported for rotation on the distal end of the rotary shaft 22, which is set upright on a base plate, not shown. The weight 23 is a so-called counterweight arranged symmetrically to the double-lens type objective lens unit 12 with respect to the rotary shaft 22. The weight mass of the weight 23 is selected to be substantially equal to that of the double-lens type objective lens unit 12.

The optical pickup device 1 also includes a biaxial actuator 20 for driving the double-lens type objective lens unit 12 in the focussing direction parallel to the optical axis and in the tracking direction perpendicular to the optical axis. Referring to FIG. 4, there are arranged focussing coils 24, 24 on the rim of the bobbin 21 of the biaxial actuator 20 diametrically oppositely to each other for causing movement of the bobbin 21 in the focussing direction indicated by arrows a and b in FIG. 4 along the rotary shaft 22. There are also arranged tracking coils 25, 25 on the rim of the bobbin 21 of the biaxial actuator 20 diametrically oppositely to each other for causing movement of the bobbin 21 in the tracking direction as indicated by arrows c and d in FIG. 4 with the rotary shaft 22 as the center of rotation.

Figure 5:
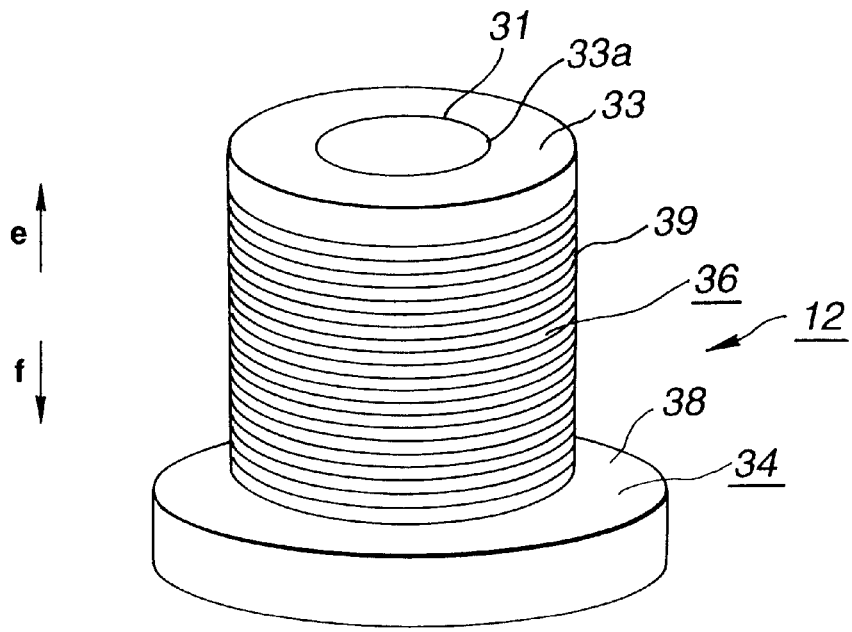
FIG. 5 is a perspective view showing a double-lens type objective lens unit provided on the optical pickup device shown in FIG. 1.
Figure 6:
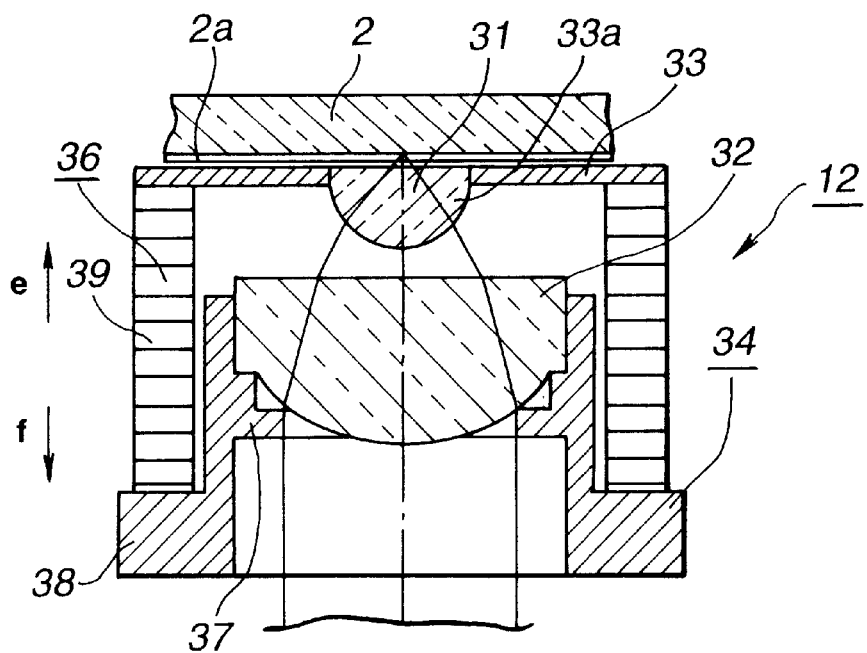
FIG. 6 is a perspective view for illustrating an objective lens provided on a conventional optical pickup device.

Referring to FIGS. 5 and 6, the double-lens type objective lens unit 12, as an essential component of the optical pickup device 1 according to the present invention, includes a first lens 31 (forward lens 31) arranged facing the optical disc 2, a second lens 32 (backward lens 32) arranged so that its optical axis coincides with the optical axis of the forward lens 31, a forward lens holder 33 for holding the forward lens 31 and a backward lens holder 34 for holding the backward lens 32.

Referring further to FIGS. 5 and 6, the double-lens type objective lens unit 12 also includes an adjustment member 36 for interconnecting the forward lens holder 33 and the backward lens holder 34 for relative movement in the direction along the optical axis as indicated by arrows e and f in FIG. 4 for adjusting the axial distance along the optical axis between the forward lens 31 and the backward lens 32.

The forward lens 31 and the backward lens 32 are of the increased numerical aperture NA of the order of 0.7 to 0.9. The forward lens holder 33 is disc-shaped and has a center hole 33a in which to hold the forward lens 31. The backward lens holder 34 is substantially cylindrically-shaped and holds the backward lens 32 at its end portion facing the forward lens 31. The backward lens holder 34 is fixedly provided on the bobbin 21.

On the inner rim of the backward lens holder 34 is formed an aperture portion 37 for throttling the laser light incident on the backward lens 32, as shown in FIG. 6. On the outer rim on the opposite end of the backward lens holder 34 is integrally formed a mounting portion 38 to which is attached one end of the adjustment member 36.

The adjustment member 36 is made up of a plurality of substantially toroidally-shaped piezoelectric elements 39 of, for example, piezoelectric ceramics, layered together in the form of a cylinder in the focussing direction corresponding to the optical axis direction indicated by arrows e and f in FIG. 3. Each piezoelectric element 39 is connected to voltage application means, not shown, and undergoes volumetric changes and consequent changes in the thickness in the focussing direction on application of an electric voltage of the order of 100 V. The adjustment member 36, on the inner rim of which is inserted the backward lens holder 34, has its end and other end secured to the mounting portion 38 of the backward lens holder 34 and to the outer rim of the surface of the forward lens holder 33.

It is noted that the biaxial actuator provided on the optical pickup device 1 is not limited to the shaft rotation type and may, for example, be of a so-called four-wire type in which the backward lens holder is adapted to support the bobbin 21 by four elastic supporting members.

The operation of the adjustment member 36 of the double-lens type objective lens unit 12 of the above-described optical pickup device 1 for adjusting the separation between the forward lens 31 and the backward lens 32 in the direction along the optical axis. When the optical disc 2 is loaded on a disc player provided with the optical pickup device 1, which then reads information signals recorded on a table-of-contents area (TOC area) adapted to supervise the information signals recorded in a data area of the optical disc 2, the optical pickup device 1 detects the thickness of the transparent substrate 2a of the loaded optical disc 2 by detecting means, not shown.

On application of a predetermined voltage across the adjustment member 36, the adjustment member 36 is changed in its thickness along the focussing direction, such that the forward lens holder 33 is moved relative to the backward lens holder 34 in the focussing direction as indicated by arrows e and f in FIG. 6.

The adjustment member 36 is configured so that, on application of the predetermined voltage, it is changed in thickness of the piezoelectric elements 39 in the layering direction by approximately 1/1000 such that the separation between the forward lens 31 and the backward lens 32 is adjusted by being varied by approximately 10 μm.

With the present optical pickup device 1, it is possible to reduce spherical aberration caused by the error in thickness of the transparent substrate 2a of the optical disc 2 by adjusting the adjustment member 36 of the separation between the forward lens 31 and the backward lens 32.

Since the optical pickup device 1 is provided with the adjustment member 36 formed by layering the piezoelectric elements, there is no necessity of providing a adjustment mechanism of a larger size, such as an electromagnetic actuator, thus reducing the thickness and size of the double-lens type objective lens unit 12. It is therefore possible with the optical pickup device 1 to reduce the thickness and size of the entire device.

Also, since the adjustment member 36 of the optical pickup device 1 operates with a lower power consumption, it is possible to reduce the power consumption required for holding the separation between the forward lens 31 and the backward lens 32.

Although the optical pickup device of the present invention exploits the three-beam method for tracking error detection, any suitable detection method, such as a one-beam method, may be used in place of the three-beam method.

What is claimed is:

1. A recording/reproducing apparatus for recording and/or reproducing the information on or from an optical recording medium by illuminating laser light thereon, comprising:
   a light source for radiating laser light;
   a first lens for converging the laser light radiated from the light source;
   a second lens arranged between the first lens and the optical recording medium;
   detection means for detecting the sort of the recording medium; and
   movement means for causing relative movement between the first and second lenses to vary the separation therebetween along the optical axis;
   said movement means being a layered assembly along the direction of the optical axis of piezoelectric elements that can be displaced in the direction along the optical axis, said layered assembly being driven in association with the results of detection by said detection means.

2. The recording/reproducing apparatus according to claim 1 wherein said movement means being a substantially tubular layered assembly of annular piezoelectric elements layered in the direction along the optical axis.

3. The recording/reproducing apparatus according to claim 2 wherein said second lens is supported for movement in the direction along the optical axis relative to said bobbin.

4. The recording/reproducing apparatus according to claim 2 wherein said second lens has a substantially planar surface facing said recording medium and a predetermined curved surface facing said first lens.

5. The recording/reproducing apparatus according to claim 1 wherein said first and second lenses are supported by a bobbin movable in a direction along the optical axis of the light radiated from the light source and in a direction perpendicular to the optical axis.

6. The recording/reproducing apparatus according to claim 1 further comprising:
   an actuator for driving the bobbin supporting the first and second lenses in a direction along the optical axis of the light radiated from the light source and in a direction perpendicular to the optical axis.

7. The recording/reproducing apparatus according to claim 1 wherein the numerical aperture NA by said first and second lenses is 0.7 or higher.

8. The recording/reproducing apparatus according to claim 1 wherein the transparent substrate covering the recording surface of the optical recording medium has a thickness approximately equal to 0.1 mm.

9. A recording/reproducing apparatus for recording and/or reproducing the information on or from an optical recording medium by illuminating laser light thereon, comprising:
   a light source for radiating laser light;
   a first lens for converging the laser light radiated from the light source;
   a second lens arranged between the first lens and the optical recording medium;

a lens holder supporting said first and second lenses;

a coil mounted on said lens holder;

a magnetic circuit for causing movement of the lens holder in a direction along the optical axis of the light radiated from the light source and in a direction perpendicular to the optical axis;

movement means for causing movement of said second lens relative to said first lens in the direction along the optical axis;

said movement means being a layered assembly of piezoelectric elements along the direction of the optical axis, said piezoelectric elements being able to be displaced in the direction along the optical axis, said layered assembly being driven in association with the results of detection by said detection means.

10. The recording/reproducing apparatus according to claim 9 wherein said movement means is a substantially tubular layered assembly of annular piezoelectric elements layered in the direction along the optical axis.

11. The recording/reproducing apparatus according to claim 9 wherein said second lens has a substantially planar surface facing said recording medium and a predetermined curved surface facing said first lens.

12. The recording/reproducing apparatus according to claim 9 wherein the numerical aperture NA by said first and second lenses is 0.7 or higher.

13. The recording/reproducing apparatus according to claim 9 wherein the transparent substrate covering the recording surface of the optical recording medium has a thickness approximately equal to 0.1 mm.

14. An optical pickup device for recording and/or reproducing the information on or from an optical recording medium by illuminating laser light thereon, comprising:

a light source for radiating laser light;

a first lens for converging the laser light radiated from the light source;

a second lens arranged between the first lens and the optical recording medium;

a lens holder supporting said first and second lenses, said lens holder supporting said second lens for movement in a direction along the optical axis;

a coil mounted on said lens holder;

a magnetic circuit for causing movement of the lens holder in a direction along the optical axis of the light radiated from the light source and in a direction perpendicular to the optical axis; and movement means for causing movement of said second lens relative to said first lens in the direction along the optical axis;

said movement means being a layered assembly of piezoelectric elements along the direction of the optical axis, said piezoelectric elements being able to be displaced in the direction along the optical axis.

15. The optical pickup device according to claim 14 wherein said movement means being a substantially tubular layered assembly of annular piezoelectric elements layered in the direction along the optical axis.

16. The optical pickup device according to claim 14 wherein said second lens has a substantially planar surface facing said recording medium and a predetermined curved surface facing said first lens.

17. The optical pickup device according to claim 14 wherein the numerical aperture NA by said first and second lenses is 0.7 or higher.

18. The optical pickup device according to claim 14 wherein the transparent substrate covering the recording surface of the optical recording medium has a thickness approximately equal to 0.1 mm.

* * * * *